Patented Dec. 20, 1938

2,140,568

UNITED STATES PATENT OFFICE 2,140,568

PRODUCTION OF CELLULOSE DERIVATIVES

Wilhelm Traube, Berlin, Germany, assignor of three-sevenths to N. V. Allgemeene Chemische en Technische Maatschappij "Achetem", The Hague, Netherlands No Drawing. Application August 2, 1935, Serial No 34,317. In Germany July 21, 1933

9 Claims. (Cl. 260—152)

My invention relates to the production of cellulose derivatives and more especially to cellulose ethers. It is an object of my invention to provide means for producing cellulose ethers generally. The subject of my invention is a process for making cellulose ethers, particularly methyl and ethyl cellulose, which in their chemical constitution and, therefore, also in their properties, differ from the previously-known methyl and ethyl celluloses. This object is attained by reason of the fact that sodium copper cellulose is employed as the initial material in the alkylizing of the cellulose instead of the sodium cellulose heretofore used.

As is well known to those skilled in the art, cellulose ethers have hitherto been produced by acting on cellulose in the presence of an alkali hydroxide with an alkylating agent and more especially with an alkyl halide. Obviously in such process all the hydroxyl groups of the cellulose are equally accessible to the action of the alkyl halide.

I have now found that cellulose ethers can also be obtained when acting with an alkylating agent on an alkali-copper-cellulose and quite especially on sodium-cupric-cellulose.

The sodium cupric cellulose is a compound of salt-like character having the constitution

[C$_6$H$_7$O$_3$(OH)(Ocu)]Na or

[C$_{12}$H$_{12}$O$_4$(OH)$_4$(Ocu)$_2$]Na$_2$ (In these formulae "cu" stands for ½ Cu.) In this compound the copper is bound in complex combination, the sodium in an ionogenic manner. If this compound is made to react with an alkylating agent, only the ionogenically bound sodium, as can easily be proven, will enter into reaction, not the copper bound in complex combination. The copper thus protects against alkylation one of the three hydroxyl groups contained in one C$_6$-group of the cellulose. Consequently the action of the alkylating agent on the sodium cupric cellulose must lead to cellulose ethers of a different constitution than the direct alkylation of the cellulose, since here, as mentioned above, all hydroxyl groups are accessible for alkylation.

In fact methyl and ethyl celluloses produced by methylation and ethylation of sodium-copper-cellulose have been found to differ in their properties from the known methyl and ethyl celluloses obtained by direct alkylation of cellulose.

The methyl celluloses hitherto produced are soluble in water only if they contain at an average at least 1.7 methyl groups per C$_6$-group of the cellulose molecule and from aqueous solutions of such methyl celluloses the methyl cellulose will separate out in flakes at once on the solution being heated.

In contradistinction thereto methylation of the sodium cupric cellulose leads to products which already dissolve completely in water and which do not contain more than 0.9 to 1.1 methyl groups per C$_6$-group. In contradistinction to the methyl celluloses hitherto known the aqueous solutions of the new methyl celluloses do not separate out the methyl cellulose on boiling.

The ethyl celluloses hitherto described are either altogether insoluble in water or dissolve therein only if it is cooled down below 15° C. From the solutions thus prepared the ethyl cellulose separates out in flakes as soon as they are heated up to room temperature. However, by acting on sodium cupric cellulose with ethyl chloride or ethyl bromide there is obtained an ethyl cellulose containing 1.0 to 1.2 ethyl groups per C$_6$-group of cellulose, and which shows different solubility properties, dissolving readily in water of room temperature to form highly viscous solutions and separating out from these solutions in the form of flakes only at a temperature of about 70° C.

Obviously the great difference in the properties of the methyl celluloses and ethyl celluloses produced in the two different ways must be due to a different arrangement of the alkyl radicals in the cellulose molecule. Probably the distribution of the alkyl radicals in the large cellulose molecule is more uniform in the alkyl celluloses produced from sodium cupric cellulose, because the exclusion of one-third of the hydroxyl groups from the reaction has reduced the number of variations of distribution of the alkyls in the cellulose molecule.

I have further found that I can produce the same water soluble methyl cellulose, which forms heat resistant aqueous solutions, if I act on sodium cupric cellulose with methyl sulfate, instead of with a methyl halide. If the methyl cellulose, mentioned above, which is soluble in water and contains 0.9 to 1.1 methyl groups per C$_6$-group of the cellulose, is decomposed, in accordance with the Irvine and Hirst process for decomposing the cellulose ethers by means of methyl-alcoholic hydrochloric acid, (Journ. Chem. Soc. 123, page 529), besides large quantities of methyl glucoside and monomethyl methyl glucoside, some dimethylated methyl glucoside, is also obtained however no trace of trimethylated methyl glucoside. In contradistinction thereto, on decomposing the water soluble methyl celluloses commercially obtainable under different trade names, such as "Tylose" or "Glutolin", one always obtains considerable quantities of trimethyl methyl glucoside. These results of the decomposition prove beyond any doubt that the methyl cellulose produced from sodium cupric cellulose is constituted differently from the methyl celluloses obtainable according to the methods hitherto described.

If the methyl cellulose which is soluble in hot and cold water is produced by treating sodium cupric cellulose with dimethyl sulfate, then care must be taken to prevent the methyl cellulose from beginning to swell up or dissolve immediately after its production. This is accomplished by adding flocculating salts to the reaction mixture, such as the neutral alkali sulfates, especially sodium sulfate and magnesium sulfate, because the water-soluble methyl cellulose prepared in accordance with the present process is not soluble in a solution of sodium sulfate or magnesium sulfate and, moreover, will not swell up therein.

Sodium cupric cellulose can be obtained by the simultaneous action of alkali hydroxide and copper hydroxide on cellulose. Alternatively sodium cupric cellulose and the corresponding compounds of the other alkali metals can also be produced, if instead of copper hydroxide a copper salt is used. To this end the cellulose is either imbibed with alkali in excess and is then worked through with about the calculated quantity of a finely powdered copper salt, or the cellulose may first be impregnated with the concentrated copper salt solution or mixed with powdered copper salt and the mixture treated with caustic alkali in excess. The cupric hydroxide separated out in fine subdivision by the alkali reacts within a few hours with the cellulose more thoroughly than the copper hydroxide previously produced in a separate operation. In view of its simplicity this method appears preferable to that described in the first place.

The sodium cupric cellulose, which is to be treated with an alkylating agent must by no means be freed completely from the water and alkali adhering to it. The free alkali is required in order to counteract the hydrolysis of the sodium cupric cellulose occurring in the presence of water. The greater the quantity of water present during the alkylation, the greater must be, as a rule, the quantity of free alkali in this solution. In some cases the caustic alkali solution need only be decanted more or less completely from the sodium cupric cellulose. In the majority of cases, however, the sodium cupric cellulose impregnated with caustic alkali solution in excess must be freed further from the caustic alkali by applying pressure before proceeding with the alkylation. To the sodium cupric cellulose produced with the aid of a copper salt there always adheres the alkali salt formed in the reaction of the copper salt with alkali, however the presence of this alkali salt does not disturb the subsequent alkylation.

In order to cause the sodium cupric cellulose, which still contains free caustic alkali solution, to react with the alkyl halide, which may be used as such or in the form of a solution, I prefer using, in the case of low boiling alkyl halides, a closed vessel preferably provided with an agitating mechanism. Gaseous alkylating agents such as methyl chloride are preferably caused to pass at a pressure above atmospheric pressure through loosely piled and heated sodium cupric cellulose. The unchanged methyl chloride escaping from the vessel is recovered. According to the character of the alkylating agent the temperature, at which the reaction is carried through, may vary between 10 and 110 to 125° C.

The copper which was contained in the sodium cupric cellulose used as the initial material always remains mixed with the methyl and ethyl celluloses made in accordance with the present process, as soon as it is produced. The reaction product is, therefore, always a mixture of the cellulose ether and either copper hydroxide or copper oxide.

In order to free the ethyl cellulose, which is not soluble in boiling water but only in water below about 70° C., from the admixed Cu(OH)$_2$ or CuO, the reaction product is treated with boiling diluted sulfuric acid or hydrochloric acid or a boiling solution of sodium bisulfate (NaHSO$_4$). In order to separate the methyl cellulose, which is soluble in water of any temperature, from Cu(OH)$_2$ and/or CuO or in order to dissolve these copper compounds adhering thereto, without simultaneously causing the methyl cellulose to go into solution, the procedure is to add, to the acid serving for dissolving the copper compounds, a salt having a flocculating action, such as sodium sulfate or magnesium sulfate. Even diluted hot solutions of these salts definitely prevent the dissolving or the swelling of the methyl cellulose.

The acids or alkali bisulfate solutions serving for dissolving the copper compounds are employed in as slight an excess as possible.

The separation of the methyl as well as the ethyl cellulose from the copper compounds adhering thereto may also be accomplished by treating the mixtures of the substances with methyl-alcoholic hydrochloric acid, in which the copper compounds dissolve as alcohol-soluble cupric chloride, while the cellulose ethers remain undissolved.

In order to obtain a methylcellulose according to this invention in the pure state, I may also bring about solution of the solid product of the reaction, which consists of methyl cellulose and cupric oxide or hydroxide and to which sufficient free acid or alkali metal bisulfate has been added to dissolve the copper compounds completely in the acid liquor, and thereafter cause flocculation of the methylcellulose from the highly viscous liquor by adding magnesium sulfate. If this operation is carried through at a temperature above normal, the magnesium sulfate solution may be rather dilute. If the quantity of the magnesium sulfate to be added in solution is so chosen that no or little flocculation of the methylcellulose occurs in the cold, the methylcellulose, on the solution being heated, will separate out in very fine flakes, which can easily be freed from copper compounds by washing them with a hot magnesium sulfate solution of 5-6%. Instead of the hot dilute magnesium sulfate solution I may also add a dilute hot zinc sulfate solution. The methylcellulose freed from copper by washing is vigorously pressed to free it from the greater part of the magnesium sulfate or zinc sulfate adhering to it and may then be used directly for certain purposes. The last traces of the sulfate may be extracted by treating the methylcellulose with methanol.

If methyl sulfate is used in the alkylation, the sodium cupric cellulose is suspended in a dilute caustic alkali solution and the mixture is treated with methyl sulfate under continuous agitation, care being taken to provide that at the end the liquid still shows an alkaline reaction.

The incompletely alkylated alkyl celluloses producible according to the process here described can be acetylated with the aid of a mixture of acetic acid and acetic anhydrid, even in the absence of a catalyst, and some of them may even be acetylated by mere boiling with glacial acetic acid.

The new alkyl celluloses here described are intended for use not only in the production of films, lacquers, threads, filaments and other forms of artificial products, but also for the production of glue-like liquids and for use in the textile industry, and also as a starting material for the production of nitro, acetyl and similar compounds.

In practising my invention I may for instance proceed as follows:

Example 1

10 parts by weight of cellulose of any suitable kind are intimately mixed with about 5 parts of crystallized and powdered cupric chloride. The mixture is introduced into 100 to 200 parts of caustic soda solution of 15 to 16 per cent strength and thoroughly worked through. The mixture is allowed to stand about 12 hours and the sodium cupric cellulose which has formed therein is freed from part of the liquor adhering to it by pressure. The blue salt is now suspended in 500 to 700 parts water, care being taken to provide that 5 to 10 molecules free NaOH are present per molecule of sodium cupric cellulose. To the mixture which is constantly held in motion, about 6 to 7 molecules methyl sulfate are gradually added. After the reaction has come to an end, the quantity of acid required to dissolve the whole of the copper hydroxide is added to the liquid and the hemimethyl cellulose thus formed, which is not soluble in water, is freed from the liquid in the usual manner.

Example 2

20 parts cellulose separated into fibres are thoroughly and uniformly imbibed with 400 parts caustic soda solution of 15 to 16 per cent strength and the mixture is vigorously worked through with about 12 parts finely powdered cupric chloride. The sodium cupric cellulose thus formed is now freed from liquid by pressure to the extent that the proportion of cellulose ($C_{12}H_{20}O_{10}$) to sodium is about 1:16. This sodium cupric cellulose containing alkali is distributed in about 1400 parts water and to the vigorously agitated mixture are added 117 parts methyl sulfate, care being taken to avoid considerable heating. The mixture is stirred some time after the methyl sulfate has disappeared. The reaction product of fibrous structure is freed from adhering liquid by strong pressure and impregnated with alcohol to which has been added some concentrated hydrochloric acid. The methyl cellulose, which separates out in almost theoretical quantity, is freed from the salts admixed therewith by extraction with methanol. The analytic examination of a methyl cellulose thus prepared, which dissolves in hot and cold water, forming highly viscous solutions, showed that 25% of the glucose radicals of the cellulose were not methylated, that in 65% only one methyl radical and only in 10% two methyl radicals were introduced.

Example 3

20 parts cellulose are converted into sodium cupric cellulose as described with reference to Example 2 and this product is then compressed until the proportion of cellulose ($C_{12}H_{20}O_{10}$) to the whole of the sodium (the sodium of the sodium chloride being not included) is about 1:5. The loosened press cake is now treated at ordinary or lower temperature and under continuous mixing during about 1 hour with a solution of 35 parts methyl sulfate in a multiple quantity of toluene. After separation from the toluene the product of reaction is introduced into dilute sulfuric acid or into a solution of sodium bisulfate containing magnesium sulfate in solution. The methyl cellulose separated in this manner is freed from the salt solution by vigorous pressure and extracted with methanol to free it from the salts admixed therewith.

Example 4

5 parts cellulose are converted with cupric chloride into sodium cupric cellulose, which is freed from the adhering liquid by pressure until about 4.5 to 5.0 atoms sodium (without counting the sodium chloride formed in the reaction) are present per 12C-group. The press cake is distributed in loosened condition in 70 to 80 parts water and to the slurry are added under continuous vigorous stirring 8 to 9 parts methyl sulfate in small portions, care being taken to prevent material heating up of the liquid. After addition of all the methyl sulfate stirring of the solution is continued for some time and it is thereafter filtered by suction. The mass remaining on the filter is treated with 40 to 45 parts methanol, to which is added 1 cubic centimetre concentrated hydrochloric acid per gram cellulose, to dissolve the copper hydroxide. The methyl cellulose is filtered by vigorous suction and freed from all salts by extraction with methanol.

In producing the pure methyl cellulose from the reaction product use may also be made of its property of being insoluble in a 6 to 10% solution of $MgSO_4$ (calculated as anhydrous $MgSO_4$) which is kept at 100° C. The raw product obtained from sodium cupric cellulose and methyl sulfate is treated after filtration by suction with a hot 6 to 10% solution of $MgSO_4$ to which has been added a quantity of sulfuric acid or sodium bisulfate sufficient to dissolve the copper hydroxide. The methyl cellulose is filtered hot by suction, washed with a hot solution of $MgSO_4$ and dried at 110° C. without allowing it to cool. The magnesium sulfate, which still adheres to the methyl cellulose, is removed by extraction with methanol. Instead of the dilute hot solution of magnesium sulfate a hot solution of zinc sulfate may be used.

Example 5

5.4 parts cellulose separated into fibres, which corresponds to 5 parts anhydrous cellulose, is impregnated with 100 parts of an about 4.2 normal caustic soda solution and to the mixture are added 2.8 parts finely powdered $CuCl_2.2H_2O$. The mass is allowed to stand 12 hours under repeated agitation and thereafter compressed so far that 4 atoms sodium (partly bound to the cupric cellulose and partly under the form of free sodium hydroxide) remain per 12C-group of the cellulose. The press cake is loosened and introduced in loose condition into an apparatus which allows passing methyl chloride into contact with the sodium cupric cellulose at a temperature up to 100° C. and under 1.5 to about 2 atmospheres pressure above normal. After having passed methyl chloride through the apparatus during several hours, the brown product of reaction is filtered by suction, dried, separated into fibres and introduced into a solution, saturated in the cold, of magnesium sulfate, to which had been added a concentrated solution of 5 parts of sodium bisulfate. The mixture is heated until all the cupric oxide has gone into solution. It is now diluted by suction, washed with cold concentrated magnesium sulfate solution, and compressed and the loosened press cake is extracted with methanol. This latter extraction is not absolutely necessary, since the small quantities of salts still adhering to the methyl cellulose do not influence its solubility in water and its possibilities of use for many purposes.

In the treatment of the reaction product the concentrated magnesium sulfate solution may be replaced by a dilute solution if care is taken that the temperature of the mixtures to be treated does not drop below about 75° C., because at a low temperature the methyl cellulose would start swelling and would partly dissolve in the dilute magnesium sulfate solution.

Example 6

5.4 parts air-dried cellulose or linters, separated into fibres, are imbibed with 100 parts caustic soda solution of about 17% and to the mixture are added 2.6 parts crystallized cupric chloride. The mixture is vigorously shaken and allowed to rest for 12 hours. The sodium cupric cellulose thus produced is freed from the liquor by pressure to such an extent that the press-cake contains about 6.3 atoms sodium per 12C-group of the cellulose, without counting the sodium chloride. The substance is now loosened and suspended in 100 parts sodium sulfate solution, which may be saturated at ordinary temperature or may be less concentrated. The suspension is now caused to react, with constant vigorous stirring, with 11.3 parts methyl sulfate. After the lapse of about one hour stirring is discontinued and the light-blue product of reaction filtered by suction, dried, powdered and introduced into a mixture of about 100 parts hot magnesium sulfate solution of about 7-8% (calculated as the anhydrous salt) and 5-6 parts anhydrous sodum bisulfate. After the whole of the copper hydroxide has dissolved, the methyl cellulose is filtered by suction, washed with a magnesium sulfate solution of 7-8%, vigorously pressed and extracted with methanol to remove the residual magnesium sulfate.

Example 7

A sodium cupric cellulose, produced from 5.4 parts air-dried linters as described with reference to Example 6, is methylated with methyl sulfate by first freeing it from the liquor to such extent that it contains about 6.3 atoms of sodium per 12C-group of the cellulose suspending it in 100 parts water and causing it to react with 11.3 parts methyl sulfate. To the liquor are added 5-6 parts anhydrous sodium bisulfate and the mixture is stirred until the whole of the cupric hydroxide and methylcellulose have gone into solution, forming a highly viscous liquid. To this solution is now added substantially the same volume of a 10-15% magnesium sulfate solution (calculated as the anhydrous salt) and the mixture is heated to 80-100° C. The methyl-cellulose separates out in fine flakes; it is filtered by suction while still hot, is then washed out with hot dilute magnesium sulfate solution, pressed and extracted with methanol.

Example 8

5 parts cellulose are converted into sodium cupric cellulose which is now freed from the adhering liquid by pressure until 3.0 to 8.0 atoms sodium are present per 12C-group of the cellulose. The loosened press cake is now heated under continuous agitation in an autoclave to 70 to 80° C. with 2.8 to 7.6 molecules ethyl bromide, according to the percentage of alkali in the sodium cupric cellulose. In order to isolate the ethyl cellulose the product of reaction is treated with a hot dilute solution of sodium bisulfate, until the cupric oxide has gone into solution, and is then freed from the inorganic salts by washing with boiling water. The ethyl cellulose thus recovered, the constitution of which substantially corresponds to a monoethyl cellulose, is soluble in cold water, but on heating the solution it will separate out in flakes.

If it is desired to produce the ethyl cellulose with the aid of ethyl chloride instead of bromide, the working temperature should be raised to 110 to 120° C.

Example 9

Cellulose of any kind is converted into sodium cupric cellulose which is freed from the adhering liquid by pressure, until there are present about 4.0 to 4.5 atoms sodium per 12C-group. The loosened press cake is heated some hours to about 100° C. with about the 10-fold quantity of benzyl chloride. From the product of reaction the unchanged benzyl chloride is removed by blowing steam through it and the comminuted benzyl cellulose is freed from copper by treating it with dilute acid.

A benzyl cellulose prepared in this manner, which is soluble in a mixture of benzene and some methanol, contains 1.5 to 1.6 benzyl groups per 6C-group of the cellulose. By boiling with glacial acetic acid it is converted into an acetyl benzyl cellulose readily soluble in acetone.

Various changes may be made in the details disclosed in the foregoing specification without departing from the invention or sacrificing the advantages thereof.

I claim:—

1. The process of producing a cellulose derivative which consists in causing an alkylating agent, selected from the group consisting of methyl and ethyl compounds, to react with alkali metal cupric cellulose, $[C_6H_7O_3(OH)(Ocu)]X$, where X represents an alkali metal, and "cu" designates ½ Cu, in the presence of free alkali, thus producing both the desired derivative and also a copper compound and treating the reaction mixture with a solvent of the said copper compound to remove it and thereby isolate the desired cellulose derivative.

2. The process of producing a cellulose derivative which consists in causing an alkylating agent, selected from the group consisting of methyl and ethyl compounds, to react with sodium cupric cellulose, $[C_6H_7O_3(OH)(Ocu)]Na$, wherein "cu" designates ½ Cu, in the presence of free alkali, thus producing both the desired derivative and also a copper compound and treating the reaction mixture with a solvent of the said copper compound to remove it and thereby isolate the desired cellulose derivative.

3. The process defined in claim 1, wherein the alkylating agent is a methyl or ethyl halide.

4. The process defined in claim 1, wherein the alkylating agent is a methyl or ethyl sulfate.

5. The process defined in claim 1, wherein the alkylating agent is methyl chloride.

6. The process defined in claim 1, wherein the alkylating agent is methyl sulfate.

7. The process defined in claim 1, wherein the alkylating agent is ethyl chloride.

8. The process defined in claim 1, wherein the solvent for the copper compound is a substance having acid reaction and wherein a flocculating agent is also added to assist in isolating the desired cellulose derivative.

9. The process defined in claim 2, modified to produce a methyl cellulose which is soluble in hot and in cold water wherein the sodium cupric cellulose is suspended in an alkaline liquor containing a neutral alkali sulfate and wherein a methylating agent is used for the alkylation.

WILHELM TRAUBE.